Nov. 12, 1929.  F. M. WILLIAMS  1,735,520
CUTTING OR TRIMMING DEVICE
Filed Dec. 27, 1926  2 Sheets-Sheet 1
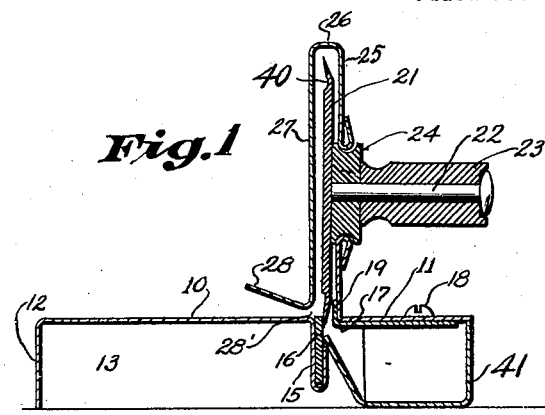
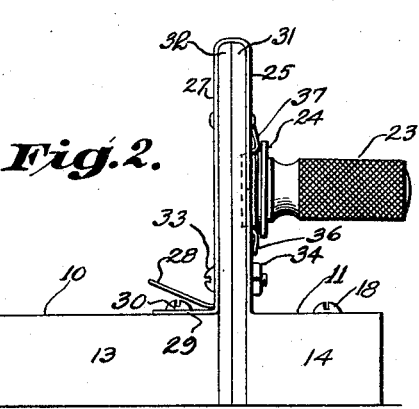
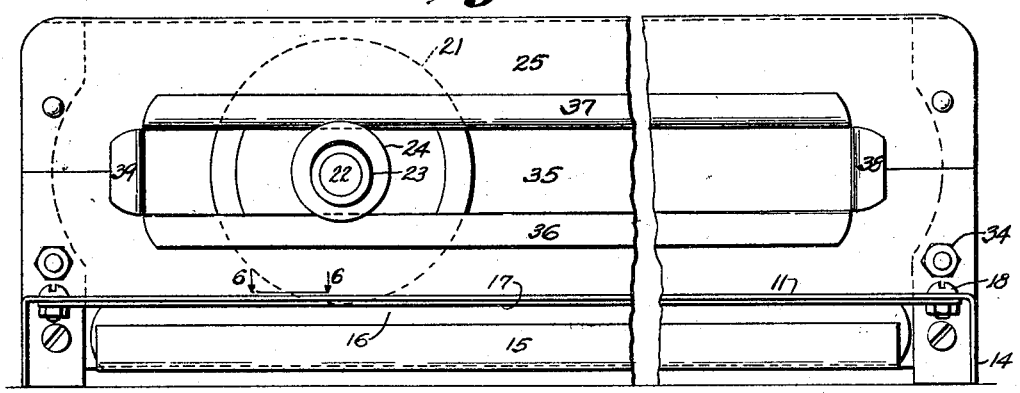
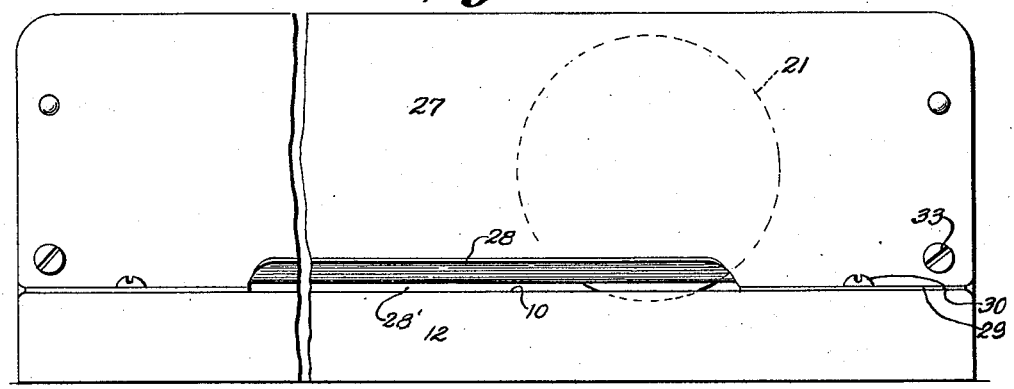
Inventor
Frank M. Williams
by Barton A. Bean Jr
Atty.

Nov. 12, 1929.   F. M. WILLIAMS   1,735,520
CUTTING OR TRIMMING DEVICE
Filed Dec. 27, 1926   2 Sheets-Sheet 2

Inventor
Frank M. Williams
by Barton A. Beau Jr.
Atty.

Patented Nov. 12, 1929

1,735,520

UNITED STATES PATENT OFFICE

FRANK M. WILLIAMS, OF WATERTOWN, NEW YORK

CUTTING OR TRIMMING DEVICE

Application filed December 27, 1926. Serial No. 157,017.

This invention relates to devices for cutting or trimming envelopes, paper or other material.

In the particular embodiment of the invention illustrated in the drawings, the device is adapted to serve as an envelope cutter or opener or paper trimming device.

The objects of the invention are to provide a device of the character referred to which consists of few parts which may be readily and easily assembled to form the complete structure; also to provide a device of the character referred to in which the necessity for springs and other tensioning parts for the cutter is eliminated; also to provide in a device of the character set forth a construction wherein the natural movements of the operator in operation of the device are translated by fixed parts of the mechanism to a most effective shearing or cutting action in the device; also to provide a device which will be relatively long-lived and maintain its efficiency without attention over a long period of time.

Further and other objects appear in the specification and claims following.

In the drawings:

Fig. 1 is a cross section through a device embodying the invention.

Fig. 2 is an end elevation thereof.

Fig. 3 is a side elevation thereof partly broken away and with the trough removed.

Fig. 4 is an elevation of the opposite side of the device partly broken away.

The invention, generally stated, comprises a support or member for receiving envelopes, paper or other material to be cut or trimmed, having as a part thereof or in conjunction therewith a suitable bed knife or plate, together with a movable cutter or wheel supported for movement in such manner that the pressure applied thereto during operation of the device urges the cutter on the material to be cut or trimmed against the bed knife or plate at more or less of an angle thereto to achieve a true shearing action on the material to be cut or trimmed.

Figure 7:
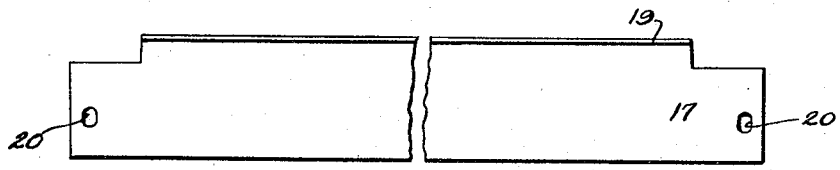
Fig. 7 is a partial plan view of the gage.

In the particular embodiment of the invention disclosed, there is provided a base consisting of members 10 and 11. These members are preferably formed of suitable sheet metal which may be readily formed to the desired shape. The member 10 is preferably provided with a downwardly depending side flange or leg 12 and a pair of duplicate end flanges 13. The member 11 is provided with a pair of end flanges 14. In the embodiment shown, the side of the member 10 opposite to the skirt or flange 12 is preferably formed as a channel, as indicated at 15, which channel receives and holds a bed knife 16. 17 designates an angle member disposed lengthwise of the member 11 and connected by suitable means such as screws 18 to the member 11. This angle member has an upwardly extending flange 19 which provides a stop or gage against which the edge of envelopes or material to be cut contacts and which determines their position in the device. As indicated in Fig. 7, the holes 20 in the gage 17 through which the screws 18 pass, may be enlarged or they may be formed as slots in order to permit of an adjustment of the gage 17 with respect to the cutting edge of the device.

21 designates a cutter which cooperates with the bed knife 16. In the particular form of the invention shown, this is a wheel or rotary cutter. As illustrated, this cutter is preferably mounted on shaft or spindle 22 which loosely carries a handle 23 to be engaged by the hand of the operator of the device. The cutter assembly also carries a suitable guide member or wheel 24. This guide wheel may be either rigidly connected to the cutter or shaft or loosely mounted thereon. In the form of the invention illustrated, the cutter is adapted to move lengthwise in either direction of the device by means of the handle 23 and the purpose of the guide member or wheel 24 is to guide the cutter and properly effect the shearing action during such movements. To effect this, in the embodiment shown there are provided tracks on which the guide wheel 24 moves. As illustrated, these tracks may be provided in an extension of the member 11. As illustrated in Figs. 1 and 3, the metal of the member 11 is continued upwardly, forming the side member 25, which contains the tracks referred to, and is thence bent as indicated at 26 and downwardly to form the side 27. In the embodiment shown the wall or side member 25 is divided horizontally or formed in two sections. A portion of the metal of the side 27 is struck out and bent upwardly, as at 28, in order to provide a slot which is indicated at 28', the lip 28 serving to guide the envelopes or papers to be cut in the device into the cutting zone. The unstruck-out portions of the side 27 extend at an angle thereto and provide flanges or ears 29 which may, as illustrated, be secured to the base portion 10 as by means of the screws 30. 31 and 32 designate pairs of posts or supports. There are preferably two pairs of these, one pair in each end of the device or housing. These are preferably of such size as to determine the spacing between the sides 25 and 27 of the device and provide means for connecting the two sides of the device together. As illustrated, this may be done by means of the screws 33 and nuts 34.

Figure 5:
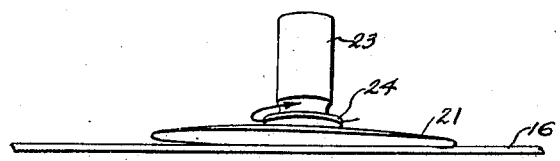
Figs. 5 and 6 are elevations of the cutting wheel and bed plate or knife illustrating the shearing action of the device in opposite directions of movement, Fig. 6 being broken away to show more clearly the point of sheering contact as it will appear about on line 6—6 of Fig. 3.
Figure 6:
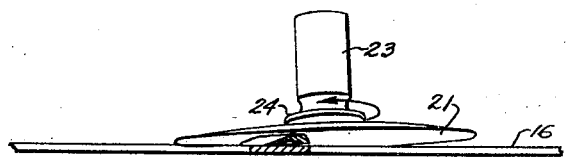

The metal of the side 25 is formed to provide a slotted portion indicated at 35. In the preferred form shown, the upper and lower edges of this metal are bent over upon the side as indicated at 36 and 37, and the vertical edges are provided with U-clips 38 and 39, which construction reinforces and thickens the metal at these points, the portions 36 and 37 providing the tracks on which the guide wheel 24 runs. This guide wheel 24 preferably fits in these tracks with some little play or looseness. In addition to this, it will be seen that only a small portion of the periphery of the guide wheel 24 is in contact at any time with the track portions 36 and 37. This, combined with the loose engagement with the tracks, results in a wobbly mounting for the cutting wheel so that when the cutting wheel is being moved in one direction or the other by means of the handle 23, the cutting wheel will be slightly canted or positioned at an angle with respect to the bed knife 16, that is, the advancing edge or portion of the cutting wheel will be positioned at such angle. This is illustrated in Figs. 5 and 6 where the arrows indicate the direction of movement of the cutting wheel. In Fig. 5 the cutter movement is toward the right, illustrating the fact that the advancing edge of the cutting wheel is disposed at an angle to the bed knife. In Fig. 6 the cutting wheel is being moved toward the left and, therefore, the left hand side of the cutting wheel is disposed at the shearing angle to the bed knife. This results in a proper frictional engagement of the edge of the cutter with the bed knife at all times during movement of the cutter, and such frictional engagement results in turning or rotating of the cutter wheel as that wheel is moved in one direction or the other by means of the handle 23. As illustrated in Fig. 1, the cutting wheel is preferably undercut, as indicated at 40. This results in a relatively small portion of the cutting wheel coming in contact with the bed knife 16 and as that portion contacts with the knife at an angle thereto, it will be seen that the device is self-sharpening. If desired, this effect may be secured by other means, as by making the cutting wheel of relatively thin metal and turning or bending the edge or providing a dished wheel of thin metal. 41 indicates a removable hopper or trough disposed beneath the cutting area of the device and which is adapted to receive the portions of material clipped or cut therefrom. With the provision of the cutting wheel so mounted that as soon as any operative movement of the device is effected the wheel is disposed at an angle to the bed knife, a device is provided which may be adjusted to remove a minimum portion of the envelope or material to be cut and make a clean, concise cut without tearing or distorting other portions of the envelope or material to be cut. This permits the opening of envelopes containing checks or enclosures without any likelihood of damage or injury to the enclosures or of injury to the cutting device by reason of coming into contact with paper fasteners or other metallic material therein.

Various modifications of the embodiment of the invention disclosed in the drawings may be made without departing from the spirit of this invention or from the structures contemplated in the following claims.

I claim:

1. In a sheet trimming device, a member adapted to receive an edge of the material to be cut, a cutter cooperable with said edge to shear material on said member, a guide member connected to said cutter, a part to receive operating pressure connected to said cutter, and a support for said guide member, said guide member being between said cutter and said part to be operated whereby when pressure is placed on said part to be operated the axis of said cutter is shifted angularly so as to position the advancing edge of said cutter at an angle with respect to said first-mentioned member.

2. In a sheet trimming device, a bed knife, a cutting wheel disposed in operative relation to said bed knife and adapted to shear material thereon, a guide wheel connected to said cutting wheel, tracks on which said guide wheel moves, said tracks extending lengthwise of said bed knife, a handle portion connected to said cutter and extending beyond said guide wheel whereby said guide wheel is positioned between said cutter proper and said handle, said guide wheel and tracks being formed to effect shifting of the axis of said cutter angularly when pressure is applied to said handle to move said cutter and guide wheel along said tracks.

3. In a sheet trimming device, a base composed of sheet metal formed to provide a channel, a bed knife held in said channel, a sheet metal part extending from the base portion upwardly to form a side, the metal of said sheet metal part being bent upon itself to provide a pair of oppositely disposed tracks, a cutting wheel disposed on one side of said part, a guide wheel connected to said cutting wheel, having a grooved portion contacting with said tracks, and a handle extending beyond said guide wheel, whereby said guide wheel and cutting wheel may be moved along said tracks and along said bed knife.

4. In a sheet trimming device, a base, a bed knife supported on edge thereby, a housing rising from the base over the bed knife and having in one side wall a slot substantially parallel to the bed knife, the walls of said slot which are parallel with the bed knife being reinforced to form guiding tracks, a rotary cutter mounted in the housing for cooperating with the bed knife, said cutter having a part extending through the housing slot and in loose guiding contact with the track, and means for operating the cutter lengthwise of the housing slot.

5. In a sheet trimming device, a base having an upwardly opening pocket therein, a bed knife disposed on edge in the pocket with its cutting edge exposed above the pocket, a gage stop mounted on the base for adjustment toward and from the cutting edge of the bed knife, a support rising from the base, and a rotary cutter having loose rolling contact with the support and having its cutting edge cooperating with the cutting edge of the bed knife and entering the space between the bed knife and said gage stop.

6. A sheet cutting apparatus comprising a fixed blade, means for positioning sheets to be cut in contact with said fixed blade, a longitudinally movably blade disposed for operative contact with the fixed blade, and a support for the movable blade, said support being formed to engage the movable blade with a loose fit permitting gyratory movement of said movable blade during longitudinal movement thereof, and an operating handle projecting from the movable blade.

7. In a sheet trimming device, a fixed bed plate knife, a rotatable cutting wheel operatively disposed relative to said bed plate knife, a shaft to which said cutting wheel is rigidly attached, said shaft being disposed at right angles to the face plane of the wheel, a guide engaging portion formed on said shaft adjacent said rotatable cutting wheel, guides for mounting said shaft and wheel, a handle on said shaft, said guides being spaced a distance greater than the diameter of said guide engaging portion formed on said shaft to provide a loose fit, said guides being adapted to contact with said guide engaging portion at diametrically opposed points thereof, whereby a shearing contact is automatically secured between a limited portion of the periphery of the cutting wheel and the bed plate knife in operative movements of the wheel in either direction with respect to the knife.

FRANK M. WILLIAMS.